A. J. MADDEN.
CLEANSING FILTER.
APPLICATION FILED NOV. 5, 1908.
992,512.
Patented May 16, 1911.
2 SHEETS—SHEET 1.
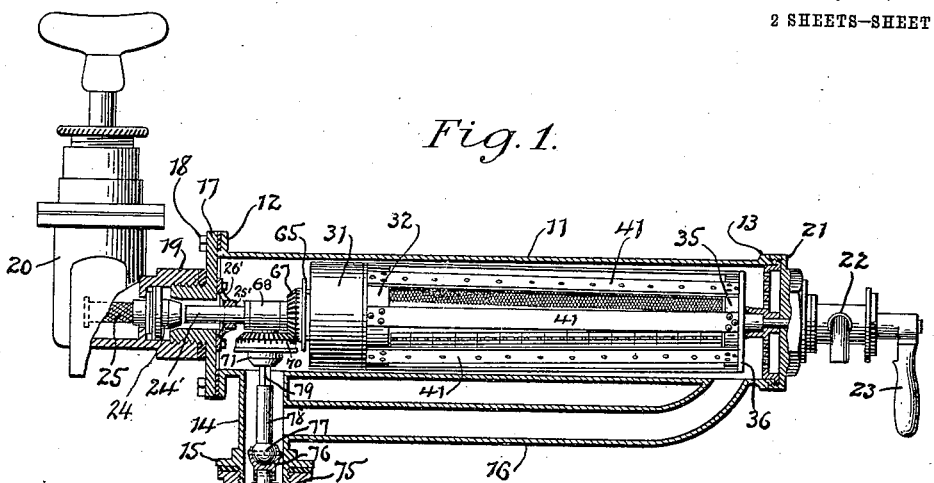
Witnesses:
A. H. Serrell
Chas. H. Smith
Inventor:
Augustine J. Madden,
By Harold Serrell
His Attorney.

A. J. MADDEN.
CLEANSING FILTER.
APPLICATION FILED NOV. 5, 1908.

992,512.

Patented May 16, 1911.

2 SHEETS—SHEET 2.

Witnesses:
A. L. Serrell
Chas H. Smith

Inventor:
Augustine J. Madden
By Harold Serrell
HIS Attorney.

UNITED STATES PATENT OFFICE.

AUGUSTINE JOHN MADDEN, OF CAULFIELD, VICTORIA, AUSTRALIA.

CLEANSING-FILTER.

992,512.  Specification of Letters Patent.  Patented May 16, 1911.

Application filed November 5, 1908. Serial No. 461,124.

*To all whom it may concern:*

Be it known that I, AUGUSTINE JOHN MADDEN, a subject of the King of Great Britain, residing at Derby Road, Caulfield, in the State of Victoria, Australia, have invented certain new and useful Improvements in Cleansing-Filters; and I do declare the following to be a full, clear, and exact description of the invention, such as will enable others skilled in the art to which it appertains to make and use the same.

This invention relates to a cleansing filter and the device comprising the same is an improvement upon that shown and described in Letters Patent No. 685,159, granted to me October 22, 1901, for a cleansing filter.

The principal objects of this invention are the improved manner of mounting the filter element in the apparatus so as to be positively supported at both ends thereof, and the provision of a series of devices adapted to be revolved around the exterior of the filter element so as to cleanse the same by the successive actions of wiping the surface, creating the suction action against the surface, scraping the surface and then brushing the surface of the different filter element,— all of which will be hereinafter more particularly described.

Figure 7:
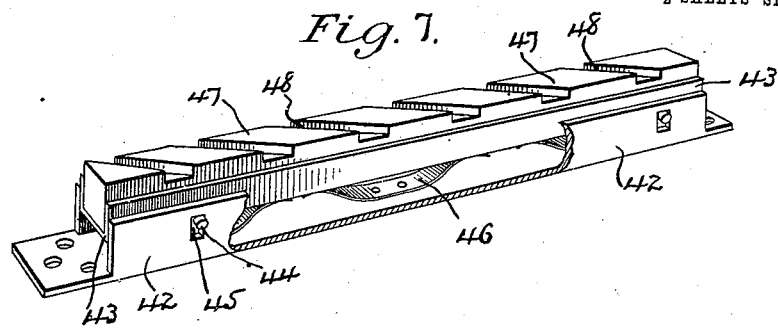
Figure 8:
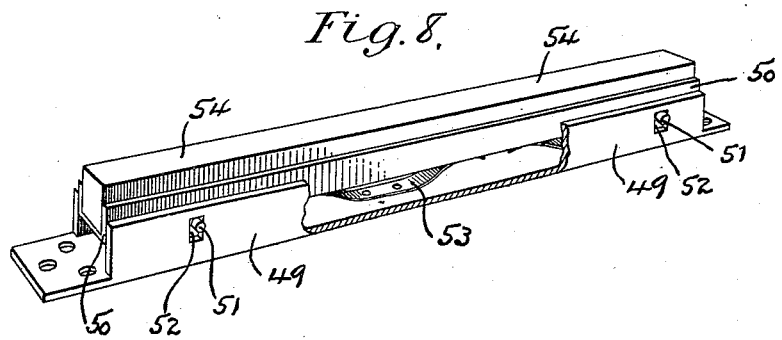
Figure 9:
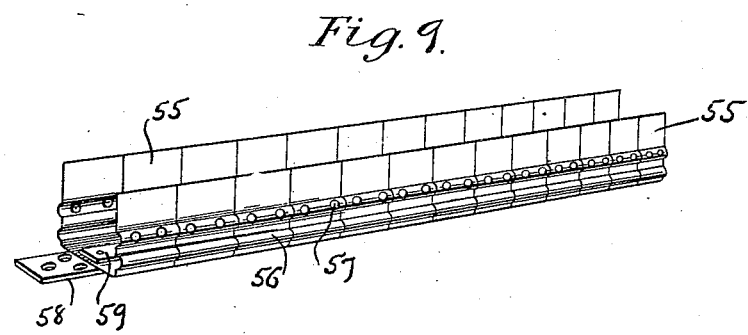
Figure 10:
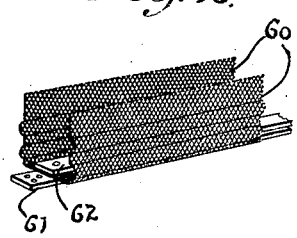

In the drawing, Figure 1 is a central longitudinal section and partial elevation illustrating a cleansing filter constructed in accordance with my present invention. Fig. 2 is a partial longitudinal section taken at one end of the filter element. Fig. 3 is a similar view taken at the opposite end of the filter element. Fig. 4 is an enlarged cross section taken through the filter element. Fig. 5 is a plan of the disk through which the drum is revolved for turning the various cleansing devices around the filter element. Fig. 6 is an elevation and partial section of a shaft and coupling employed in turning the cleansing devices. Fig. 7 is a perspective view showing the wiping element. Fig. 8 is a similar view illustrating the element employed for effecting the suction action against the surface of the filter element. Fig. 9 is a perspective view illustrating the scraper, and Fig. 10 is a perspective view showing a portion of the brush.

Referring to the drawing, 11 designates a casing which is made of metal or other suitable material, is cylindrical in form, and is provided at one end with a flange 12 and adjacent to the opposite end with a rib 13. Extending from the casing 11 at a point adjacent to the flange 12, is a nozzle 14 provided with a flange 15, and extending between the nozzle 14 and the opposite end of the casing 11, is an exterior pipe 16 providing for communication between these members of the apparatus.

The casing 11 is secured to a cap 17 by having its flange 12 secured thereto by means of bolts 18 or otherwise, and this cap 17 is provided with an exteriorly screw-threaded portion adapted to be received in the socket 19 provided for this purpose on the side or in any desired position in a faucet 20. At the opposite end, the casing 11, exteriorly and beyond the rib 13, is preferably screw-threaded and adapted to receive the cap 21, to which is connected a faucet 22, opened and closed by the turning of a handle 23 to turn on and off the filtered water.

Within the socket 19 I employ a tube 24 which at one end is preferably provided with a gauze head 25, or a head made of other similar filtering material, and a tight joint is made exteriorly of the tube 24 between the flange at the end of the socket 19 and the exteriorly screw-threaded portion of the cap 17, so that the water entering the filter must pass through the gauze or said head 25. Preferably in alinement with the tube 24, I employ a rod 24'. The member 26 is connected to one end of the rod 24' and the opposite end of this rod 24' is journaled in a bearing 25' carried by a spider 26' or similar device which is connected to the cap 17 in any suitable manner. A portion of the surface of the member 26 is screw-threaded and over this screw-threaded surface a socket 27 is received. Between the socket 27 and the member 26, the flange 28 of a filter element or candle 29 is secured between the intervening gaskets, which are indicated at 30. Fitting over the socket 27 is another socket 31 adapted to be revolved on the said socket 27 and connected to this socket 31 is a ring 32. A socket 33 fits over the opposite and open end of the filter element 29 and connected to this socket 33 and communicating 24 from the faucet 20 to the interior of the casing 11 and the exterior of the filter element 29, which as will be understood, may be made of any suitable porous material, by which the water is filtered in passing and from which the filtered water is drawn at the faucet 22. It will also be apparent that by turning the handle 74, the valve spindle 73 may be revolved to open the valve 75 and permit the water to escape through the spout indicated at 82, Fig. 1, and in so doing the spindle 73 will turn the gear 70 which will turn the gear 67, whereby the socket 31 is revolved and the hereinbefore described wiper, suction action, scraper and brushing elements are turned about the exterior of the filter element to cleanse the same, and furthermore that the refuse so removed from the outer surface of the filter is flushed by way of the connection 16 through the spout 82 and removed from the filter, and this cleansing action of the parts as described will be effected not only during the opening of the valve 75, but also during the closing thereof.

By reference to Fig. 1 it will be seen that the water or other liquid to be filtered after passing from the supply pipe will flow through the gauze head 25 into and through the tube 24 and will pass between the legs of the spider 26' to the space in the left hand end of the shell 11, thence passing over and around the drum 31 to the space exterior of the filter element 29 and between the same and the shell 11.

I claim as my invention:

1. A filter comprising a casing, a cylindrical filter candle, devices at both ends of the said filter candle for supporting the same in the said casing, a U-shaped frame running parallel with the said filter candle and secured in a spaced apart position therefrom, an inner frame within the said frame, a strip of resilient material secured within the said inner frame and provided in its outer surface which is adapted to bear against the surface of the said filter candle, with series of diagonally spaced apart recesses, and means for revolving the said frames and the strip of resilient material about the said filter candle.

2. A filter comprising a casing, a cylindrical filter candle, devices at both ends of said filter candle for supporting the same in the said casing, a U-shaped frame running parallel with the said filter candle and secured in a spaced apart position therefrom, an inner frame within the said frame, a strip of resilient material secured within the said inner frame and provided in its outer surface which is adapted to bear against the surface of the said filter candle, with series of diagonally spaced apart recesses, a second frame also running longitudinally with the said filter candle and secured in a spaced apart position therefrom, an inner frame mounted in this second frame, a strip of resilient material secured in the said second inner frame and adapted to bear against the surface of the said filter candle, and means for revolving both the aforesaid frames and their respective strips of resilient material about the said filter candle to cleanse the surface thereof.

3. A filter comprising a casing, a cylindrical filter candle, devices at both ends of the said filter candle for supporting the same in the said casing, a U-shaped frame running parallel with the said filter candle and secured in a spaced apart position therefrom, an inner frame within the said frame, a strip of resilient material within the said inner frame and provided in its outer surface which is adapted to bear against the surface of the said filter candle, with series of diagonally spaced apart recesses, a second frame also running longitudinally with the said filter candle and secured in a spaced apart position therefrom, an inner frame mounted in this second frame, a strip of resilient material secured in the said second inner frame and adapted to bear against the surface of the said filter candle, a series of U-shaped members placed in alinement with one another and secured in position longitudinally of the said filter candle so that the edges of the said U-shaped members contact with the surface of the filter candle, and means for simultaneously revolving both the aforesaid frames and their respective strips of resilient material and the said U-shaped members about the said filter candle so as to cleanse the surface thereof.

4. A filter comprising a casing, a cylindrical filter candle, devices at both ends of the said filter candle for supporting the same in the said casing, a U-shaped frame running parallel with the said filter candle and secured in a spaced apart position therefrom, an inner frame within the said frame, a strip of resilient material secured within the said inner frame and provided in its outer surface which is adapted to bear against the surface of the said filter candle, with series of diagonally spaced apart recesses, a second frame also running longitudinally with the said filter candle and secured in a spaced apart position therefrom, an inner frame mounted in this second frame, a strip of resilient material secured in the said second inner frame and adapted to bear against the surface of the said filter candle, a series of U-shaped members placed in alinement with one another and secured in position longitudinally of the said filter candle so that the edges of the said U-shaped members contact with the surface of the filter candle, a piece of U-shaped gauze material also secured in position so that the edges thereof contact with the surface of the filter candle, and